United States Patent
Arimilli et al.

(10) Patent No.: US 8,977,752 B2
(45) Date of Patent: Mar. 10, 2015

(54) EVENT-BASED DYNAMIC RESOURCE PROVISIONING

(75) Inventors: Ravi Kumar Arimilli, Austin, TX (US); Piyush Chaudhary, Highland, NY (US)

(73) Assignee: International Business Machines Company, Armonk, NY (US)

( * ) Notice: Subject to any disclaimer, the term of this patent is extended or adjusted under 35 U.S.C. 154(b) by 1225 days.

(21) Appl. No.: 12/424,893

(22) Filed: Apr. 16, 2009

(65) Prior Publication Data
US 2010/0269119 A1    Oct. 21, 2010

(51) Int. Cl.
G06F 15/173 (2006.01)
G06F 15/16 (2006.01)
G06F 9/50 (2006.01)

(52) U.S. Cl.
CPC ............ *G06F 9/5011* (2013.01); *G06F 9/5061* (2013.01)
USPC ............................. 709/226; 709/201; 709/203

(58) Field of Classification Search
USPC ......................................... 709/226, 201, 203
See application file for complete search history.

(56) References Cited

U.S. PATENT DOCUMENTS

| | | | |
|---|---|---|---|
| 5,913,068 A | 6/1999 | Matoba | |
| 5,996,013 A * | 11/1999 | Delp et al. | 709/226 |
| 6,636,721 B2 * | 10/2003 | Threadgill et al. | 455/12.1 |
| 6,857,020 B1 * | 2/2005 | Chaar et al. | 709/226 |
| 7,062,448 B2 * | 6/2006 | Trautmann et al. | 705/7.12 |
| 7,483,939 B2 * | 1/2009 | Mussack et al. | 709/201 |
| 7,752,623 B1 * | 7/2010 | Crawford, Jr. | 718/104 |
| 7,930,491 B1 * | 4/2011 | Xu et al. | 711/154 |
| 8,026,933 B2 * | 9/2011 | Baier et al. | 345/660 |
| 8,560,671 B1 * | 10/2013 | Yahalom et al. | 709/224 |
| 2002/0004913 A1 | 1/2002 | Fung | |
| 2002/0194045 A1 * | 12/2002 | Shay et al. | 705/8 |
| 2005/0198636 A1 * | 9/2005 | Barsness et al. | 718/100 |
| 2006/0123422 A1 | 6/2006 | Felter et al. | |
| 2009/0177775 A1 * | 7/2009 | Radia et al. | 709/226 |

* cited by examiner

*Primary Examiner* — Minh-Chau Nguyen
(74) *Attorney, Agent, or Firm* — Russell Ng PLLC; Diana L. Roberts

(57) ABSTRACT

Disclosed are a method, a system and a computer program product for automatically allocating and de-allocating resources for jobs executed or processed by one or more supercomputer systems. In one or more embodiments, a supercomputing system can process multiple jobs with respective supercomputing resources. A global resource manager can automatically allocate additional resources to a first job and de-allocate resources from a second job. In one or more embodiments, the global resource manager can provide the de-allocated resources to the first job as additional supercomputing resources. In one or more embodiments, the first job can use the additional supercomputing resources to perform data analysis at a higher resolution, and the additional resources can compensate for an amount of time the higher resolution analysis would take using originally allocated supercomputing resources.

18 Claims, 9 Drawing Sheets

EVENT-BASED DYNAMIC RESOURCE PROVISIONING

This invention was made with United State Government support under Agreement No. HR0011-07-9-002, awarded by DARPA. THE GOVERNMENT HAS CERTAIN RIGHTS IN THE INVENTION.

BACKGROUND

1. Technical Field

The present invention generally relates to supercomputing systems. More specifically, the present invention relates to automatically allocating resources in supercomputing systems.

2. Description of the Related Art

The term high performance computing (HPC) or supercomputing has typically been used to refer to a parallel computing system that includes multiple processors linked together with commercially available interconnects. Usually, computing systems that operate at or above the teraflops ($10^9$ floating point operations/second) region are considered HPC systems. HPC systems increasingly dominate the world of supercomputing due to their flexibility, power, and relatively low cost per operation. HPC has commonly been associated scientific research and engineering applications. Recently, HPC has been applied to business uses of cluster-based supercomputers, e.g., data warehouses, line-of-business applications, and transaction processing. A computer cluster is a group of loosely coupled computers that closely work together. The components of a computer cluster are frequently connected to each other through fast local area networks (LANs). Computer clusters are usually deployed to improve performance and/or availability over that provided by a single computer, while typically being much more cost-effective than single computers of comparable speed and/or availability.

A number of commercially available software applications are known that perform job scheduling for computer systems. For example, Portable Batch System™ is a software application that performs job scheduling. A primary task of Portable Batch System™ is to allocate batch jobs among available computing resources. Portable Batch System™ is supported as a job scheduler mechanism by several meta schedulers, which are designed to optimize computational workloads by combining multiple distributed resource managers into a single aggregated manager, allowing batch jobs to be directed to a best location for execution. As another example, LoadLeveler™ is a software application that performs job scheduling for batch jobs, while attempting to match job requirements with a best available computer resource for execution. As yet another example, Load Sharing Facility™ is another software application that performs job scheduling.

Typically, there can be a data resolution or fidelity component or attribute associated with processing a data set processed by supercomputing resources. For example, the data set can include a finer resolution than what is being processed by the supercomputing resources. Based on the resolution chosen, the processing load of the data set can be distributed among the supercomputing resources. For instance, the processing load of the data set can be distributed among the supercomputing resources using one or more tools described above. However, existing methods and/or systems do not provide for instances where the supercomputing resources can automatically determine and respond to an event where one or more portions of the data set should be processes with greater fidelity or resolution. Typically, human interaction and/or intervention is used to change the resolution of portions of the data set and re-distribute the workload.

SUMMARY

Disclosed are a method, a system and a computer program product for automatically allocating and de-allocating resources for jobs executed or processed by one or more supercomputer systems. In one or more embodiments, a supercomputing system can process a first supercomputing job with a first amount of resources of the supercomputing system. For example, the first supercomputing job can process data with a first resolution or fidelity. The first supercomputing job can detect and/or determine at least one portion of the data that meets a state or an approximate state and transmit a message to a global resource manager that an event has been triggered. The global resource manager can determine that a first event occurred and can determine that a higher resolution in analyzing the data that triggered the event is to be utilized. In one or more embodiments, performing a higher resolution analysis of the data can increase an amount of time in processing all of the data. For example, the analysis of all the data may be bounded to occur within a first amount of time. The global resource manager may calculate or compute an amount of additional resources needed to complete the analysis of the data within the amount of time while taking into account the additional resolution of a portion of the data that triggered the event. In one or more embodiments, the global resource manager can determine a first amount of additional resources of the supercomputing system based on a first resolution, a second resolution, a size of the data set, and a target completion time for the first supercomputing job. The global resource manager can allocate the first amount of additional resources of the supercomputing system and distribute at least a portion of the data set to the first additional supercomputing resources. The supercomputing system can process the first supercomputing job with the first amount of resources of the supercomputing system and the first amount of additional resources of the supercomputing system. In one or more embodiments, the supercomputing system can process a second supercomputing job with a second amount of resources of the supercomputing system and de-allocate a portion of the second amount of resources of the supercomputing system of the second supercomputing job to provide the first supercomputing job additional resources.

BRIEF DESCRIPTION OF THE DRAWINGS

The invention itself, as well as advantages thereof, will best be understood by reference to the following detailed description of one or more embodiments when read in conjunction with the accompanying drawings, wherein.

DETAILED DESCRIPTION

Disclosed are a method, a system and a computer program product for automatically allocating and de-allocating resources for jobs executed or processed by one or more supercomputer systems. In one or more embodiments, a supercomputing system can process a first supercomputing job with a first amount of resources of the supercomputing system. For example, the first supercomputing job can process data with a first resolution or fidelity. The first supercomputing job can detect and/or determine at least one portion of the data that meets a state or an approximate state and transmit a message to a global resource manager that an event has been triggered. The global resource manager can determine that a first event occurred and can determine that a higher resolution in analyzing the data that triggered the event is to be utilized. In one or more embodiments, performing a higher resolution analysis of the data can increase an amount of time in processing all of the data. For example, the analysis of all the data may be bounded to occur within a first amount of time. The global resource manager may calculate or compute an amount of additional resources needed to complete the analysis of the data within the amount of time while taking into account the additional resolution of a portion of the data that triggered the event. In one or more embodiments, the global resource manager can determine a first amount of additional resources of the supercomputing system based on a first resolution, a second resolution, a size of the data set, and a target completion time for the first supercomputing job. The global resource manager can allocate the first amount of additional resources of the supercomputing system and distribute at least a portion of the data set to the first additional supercomputing resources. The supercomputing system can process the first supercomputing job with the first amount of resources of the supercomputing system and the first amount of additional resources of the supercomputing system. In one or more embodiments, the supercomputing system can process a second supercomputing job with a second amount of resources of the supercomputing system and de-allocate a portion of the second amount of resources of the supercomputing system of the second supercomputing job to provide the first supercomputing job additional resources.

Figure 1:
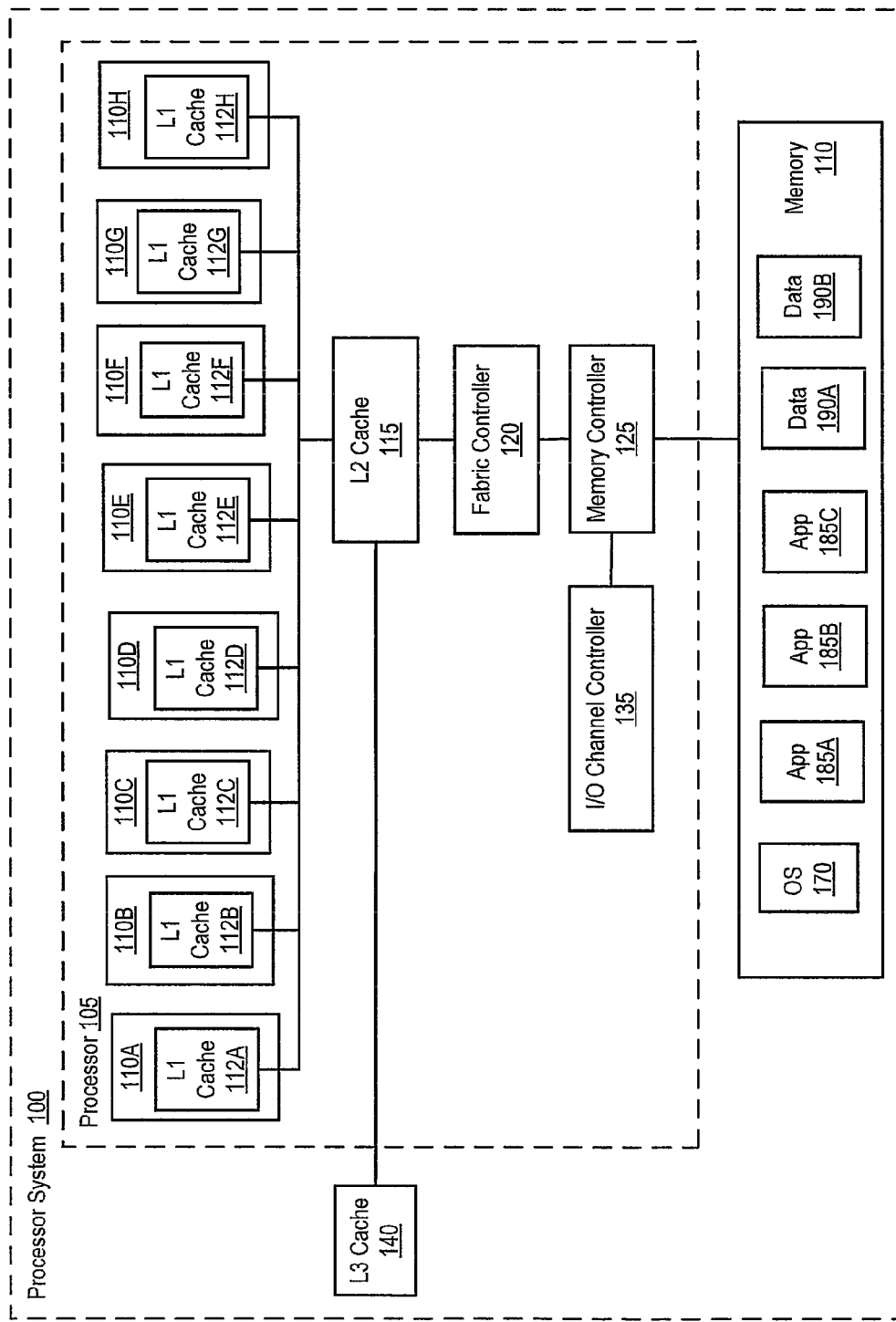
FIG. 1 provides a block diagram representation of a processor system, according to one or more embodiments.

Turning now to FIG. 1, there is depicted a block diagram representation of a processor system, according to one or more embodiments. As is illustrated, a processor system 100 includes at least one chip-level multiprocessor (CMP) 105 (only one of which is illustrated in FIG. 1), each of which includes one or more processors 110A-110H (e.g., cores). In one or more embodiments, CMP 105 can correspond to a node (or a portion of a node) of a supercomputing system or HPC cluster.

Processors 110A-110H can, for example, operate in a multithreading (MT) mode or a single thread (ST) mode. When processors 110A-110H operate in the MT mode, processors 110A-11011 can employ multiple separate instruction fetch address registers to store program counters for multiple threads. In one or more embodiments, each of processors 110A-110H include a respective first level (L1) cache memory 112A-112H that is coupled to a shared second level (L2) cache memory 115, which is coupled to a shared third level (L3) cache memory 140 and a fabric controller 120. In one or more embodiments, fabric controller 120 can support an interconnect fabric by which processor 105 can communicate with and share data with other processors.

As is illustrated, fabric controller 120 is coupled to a memory controller (e.g., included in a Northbridge) 125, which is coupled to a memory subsystem 110. For example, memory subsystem 110 can provide storage where data and/or processor instructions/code can be stored and/or retrieved. In one or more embodiments, memory subsystem 110 can include a random access memory and/or computer system memory such as DRAM, SRAM, EDO RAM, Rambus RAM, NVRAM, EPROM, EEPROM, flash memory, etc. Memory subsystem 110 can include other types of memory as well, or combinations thereof. Memory subsystem 110 includes an application appropriate amount of volatile and/or non-volatile memory. For example, memory subsystem 110 can include an amount of volatile and/or non-volatile memory to store utilities or applications 185A-185C such that applications 185A-185C can be executed by processor 105.

In one or more embodiments, fabric controller 120 can be omitted and, in this case, the L2 cache 115 can be directly connected to memory controller 125. Fabric controller 120, when implemented, can facilitate communication between different CMPs and between processors 110A-110H and memory subsystem 110 and can function as in interface in this manner.

It should be appreciated that the various techniques disclosed herein are equally applicable to systems that employ separate L2 caches for each of processors 110A-110H, as well as systems that employ separate L2 and L3 caches for each of processors 110A-110H. Each of the L1, L2, and L3 caches can be combined instruction and data caches or correspond to separate instruction and data caches. As is shown in FIG. 1, memory controller 125 can also coupled to an I/O channel controller (e.g., included in a Southbridge) 135.

In one or more embodiments, I/O channel controller 135 can provide connectivity and control for one or more input devices and/or one or more output devices. In one example, I/O channel controller 135 can be coupled to various non-volatile memory such as a magnetic media, e.g., a hard drive, floppy drive, etc., where data/instructions/code can be stored and/or from where data/instructions/code can be retrieved.

In one or more embodiments, software/program instructions/code/logic can be stored in memory 110 and executed by processor 105 to complete and/or implement various features described herein. In one or more embodiments, an operating system (OS) 170 and applications 185A-185C can be stored in memory 110 and executed by processor 105.

Figure 2A:
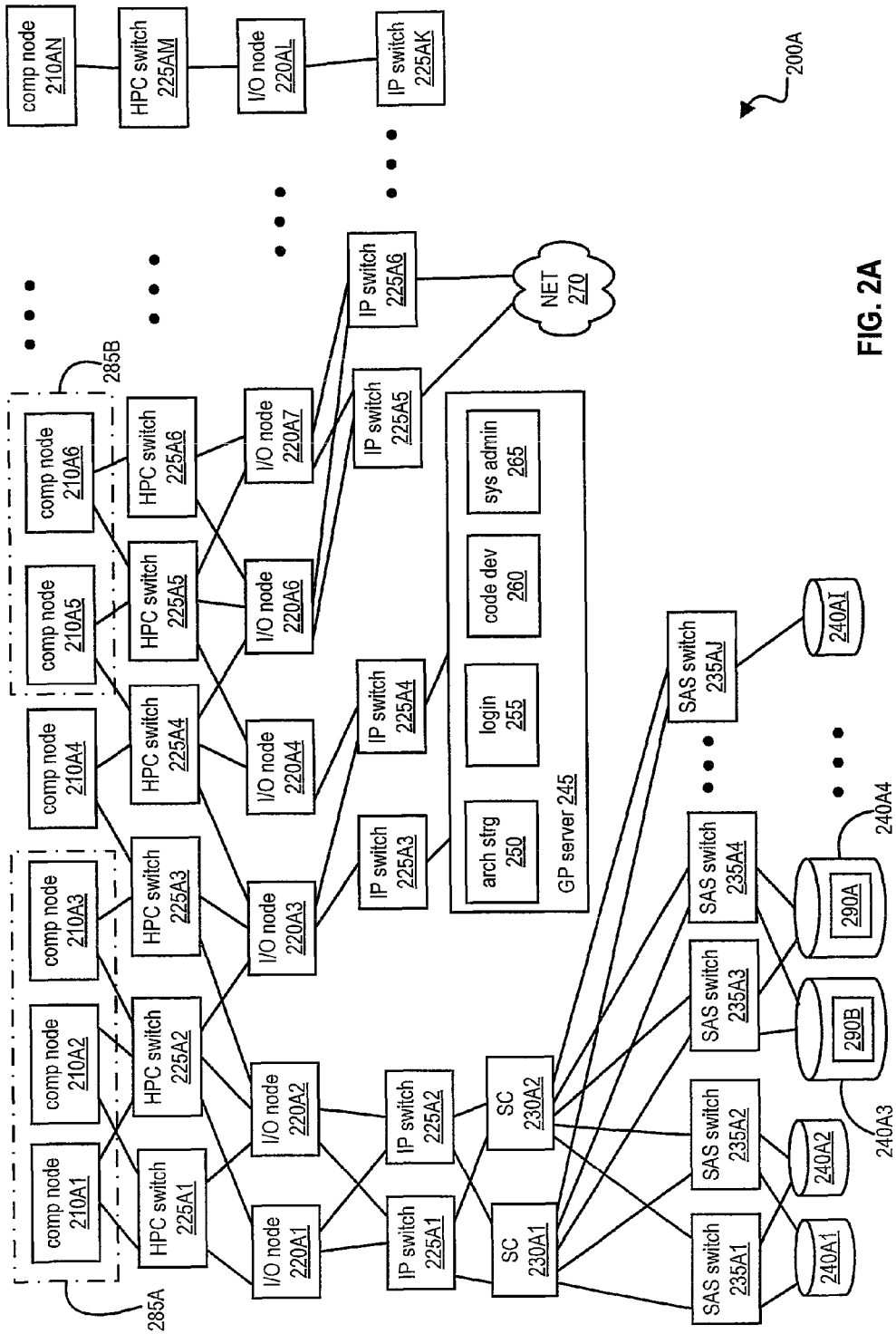
FIGS. 2A-2D provide block diagram representations of a supercomputing system, according to one or more embodiments.

Turning now to FIG. 2A, a supercomputing system is illustrated, according to one or more embodiments. As shown, a supercomputing system 200A can include compute nodes (comp nodes) 210A1-210AN (for some non-zero natural number N) coupled to high performance computing (HPC) switches 225A1-225AM (for some non-zero natural number M) coupled to input/output (I/O) nodes 220A1-220AL (for some non-zero natural number L) coupled to Internet protocol (IP) switches 225A1-225AK (for some non-zero natural number K). In one or more embodiments, each of compute nodes 210A1-210AN can include elements, features, and/or functionality of processor system 100.

As illustrated, IP switches 225A1 and 225A2 can be coupled to storage controllers (SCs) 230A1 and 230A2 via fiber channel connections, IP switches 225A3 and 225A4 can be coupled to a general purpose (GP) server 245 via gigabit Ethernet, and IP switches 225A5 and 225A6 can be coupled to a network (NET) 270 via gigabit Ethernet. In one or more embodiments, NET 270 can include and/or be coupled to one or more of a local area network (LAN), a wide area network (WAN), a public switched telephone network (PSTN), and an Internet. As shown, SCs 230A1 and 230A2 can be coupled to serial attached SCSI (SAS) switches 235A1-235AJ (for some non-zero natural number J) which can be coupled to JBODs (just a bunch of disks) 240A1-240AI (for some non-zero natural number I). GP server 245 can include services of archival storage 250 (e.g., tape storage), login 255 (e.g., user interface, remote user interface, etc.), code development 260 (e.g., compilers, development framework, debugger(s), profiler(s), simulator(s), etc.), and system administration 265.

In supercomputing system 200A, each of SCs 230A1 and 230A2 and I/O nodes 220A1-220AL is a computer system. Each of I/O nodes 220A1-220AL can include HPC host channel adapters (HCAs) to interface with two or more HPC switches 225A1-225AM and can include fiber channel network adapters and/or gigabit Ethernet network adapters to interface with two or more of IP switches 225A1-225AK. Each of SCs 230A1 and 230A2 can include fiber channel network adapters to interface with IP switches 225A1 and 225A2 and can include SAS controller adapters to interface with SAS switches 235A1-235AJ. In one or more implementations of supercomputing system 200A, there can be around one thousand five hundred (1500) compute nodes, one hundred twelve (112) I/O nodes, and thirty-two (32) storage controllers.

Figure 2B:
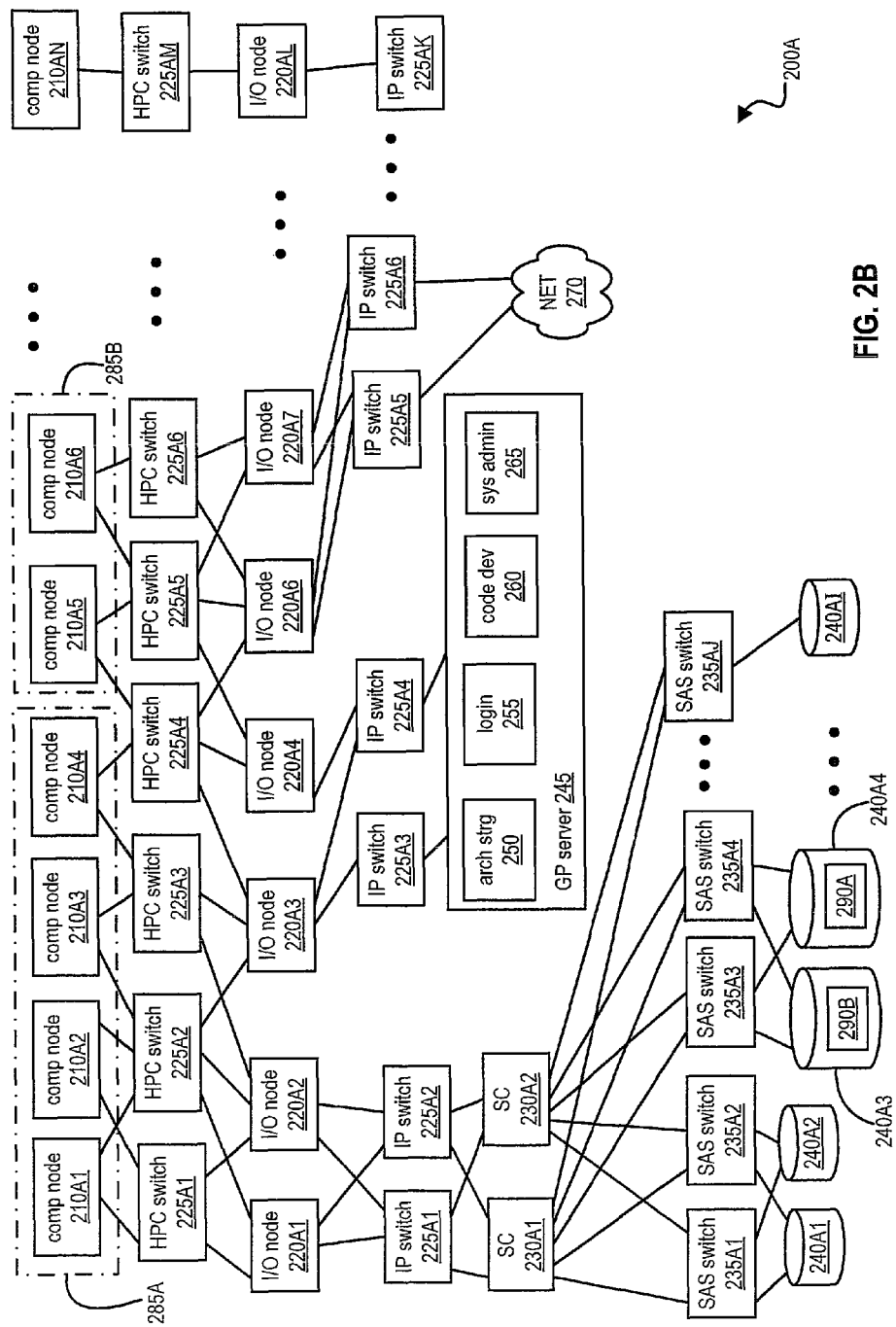

In one or more embodiments, a first job can be executed by a first set of compute nodes and a second job can be executed by a second set of compute nodes. For example, a first job 285A can be executed on compute nodes 210A1-210A3, and a second job 285B can be executed on compute nodes 210A5 and 210A6. For instance, job 285A can execute application 185A and can use data 290A stored in JBOD 240A4, and job 285B can execute application 185B and can use data 290B stored in JBOD 240A3. In one or more embodiments, additional supercomputing resources can be allocated for the first job. For example, compute node 210A4 can be allocated for job 285A, as illustrated in FIG. 2B which shows supercomputing system 200A where compute nodes 210A1-210A4 can be allocated for job 285A.

Figure 2C:
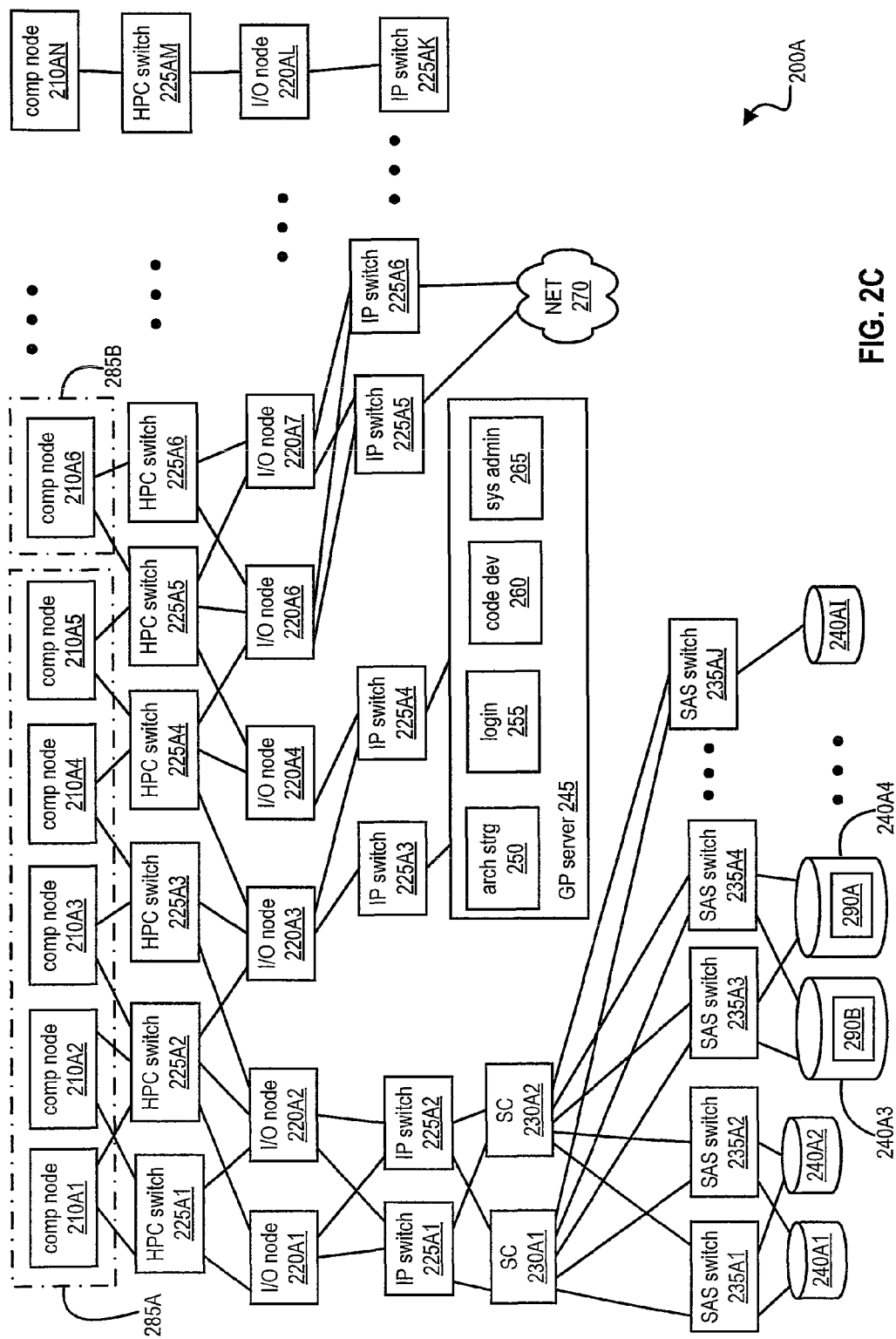
Figure 2D:
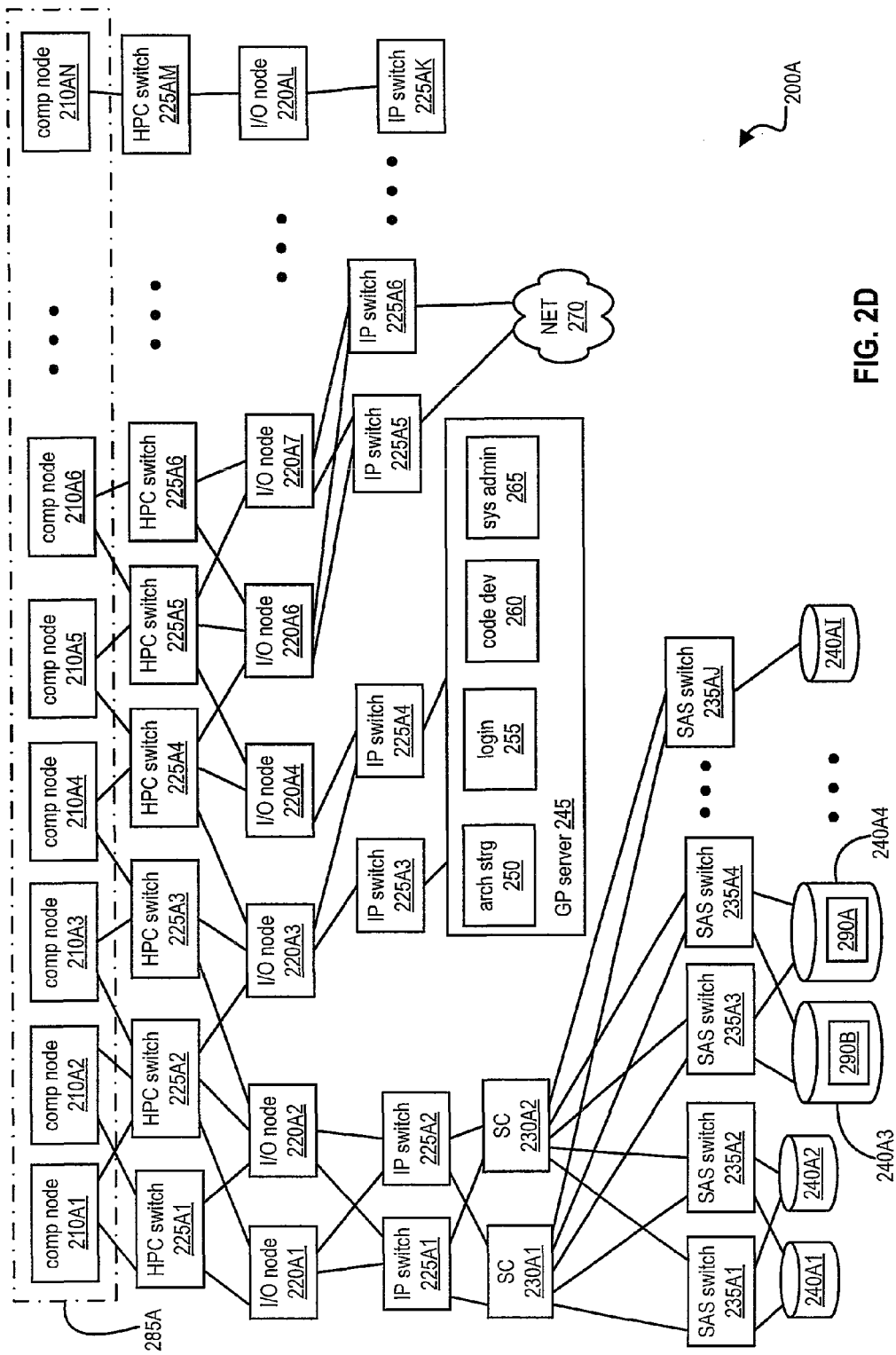

In one or more embodiments, computing resources of the second job can be contracted such that additional computing resources can be used for the first job. For example, computing resources for job 285B can be contracted, and those resources that were taken from job 285B can be provided to job 285A. For instance, compute node 210A5 can be taken from job 285B and provided to job 285A, as illustrated in FIG. 2C which shows supercomputing system 200A where compute nodes 210A1-210A5 can be allocated for job 285A, and job 285B includes compute node 210A6. In one or more embodiments, computing resources of the second job can be contracted such that the second job may not be executed, and the first job can utilize all computing resources of the supercomputing system. As shown in FIG. 2D, for example, job 285A can use all of the compute nodes, e.g., compute nodes 210A1-210AN, of supercomputing system 200A.

Figure 2E:
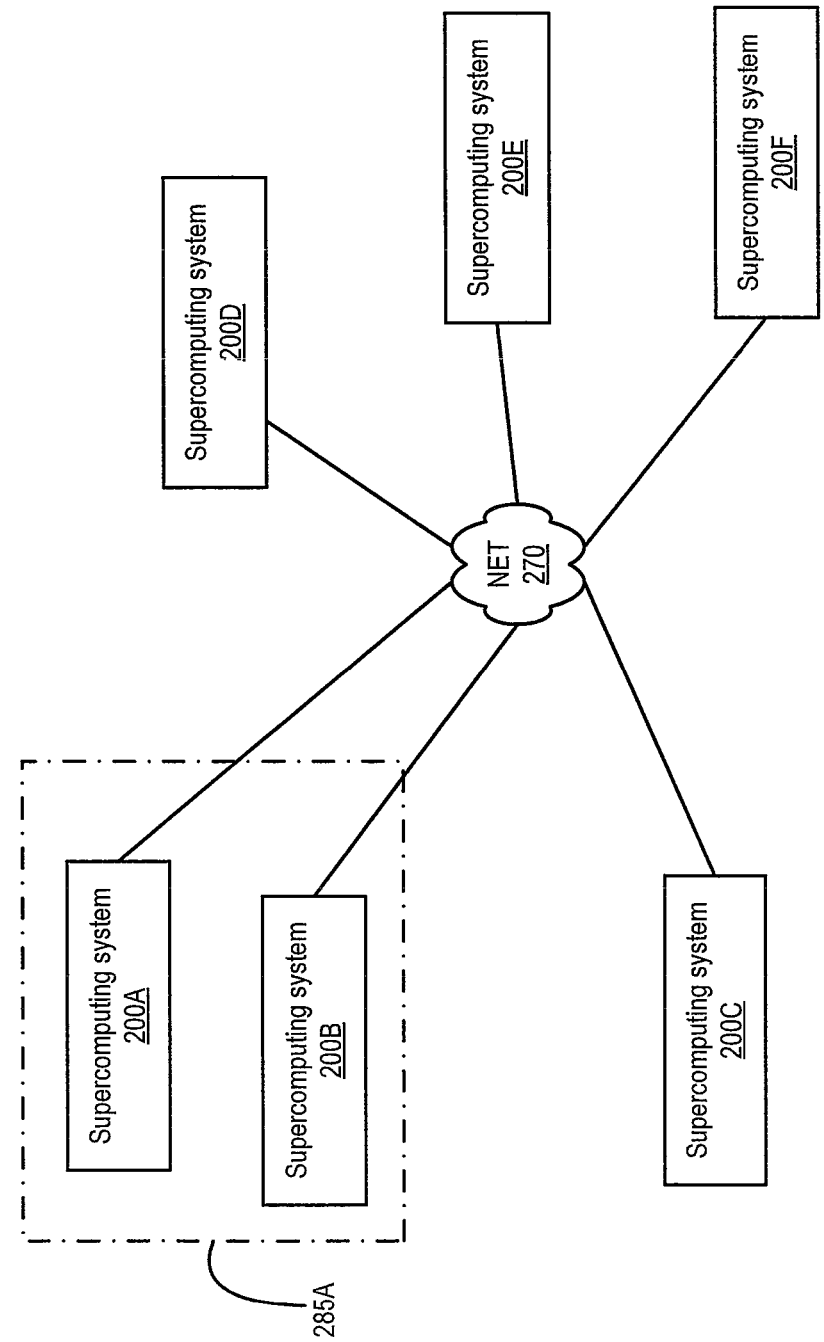
FIGS. 2E-2F provide block diagram representations of supercomputing systems coupled to a network, according to one or more embodiments.

Turning now to FIG. 2E, a block diagram of supercomputing systems coupled to a network is illustrated, according to one or more embodiments. As shown, supercomputing systems 200A-200F can be coupled to NET 270. In one or more embodiments, each of supercomputing systems 200B-200F can include elements, features and/or functionalities of supercomputing system 200A.

In one or more embodiments, a job can be executed by multiple supercomputing systems. As shown, job 285A can be executed on supercomputing systems 200A and 200B. For example, job 285A may have exhausted resources of supercomputing system 200A to complete in a time period and provide a resolution according to some specification, configuration, and/or metric. Accordingly, job 285A can be executed on one or more portions of supercomputing system 200B (such as job 285A executed on one or more portions of supercomputing system 200A with respect to FIGS. 2A-2C) or all resources of supercomputing system 200B can be allocated to executing job 285A (such as job 285A executed on all compute nodes of supercomputing system 200A with respect to FIG. 2D).

Figure 2F:
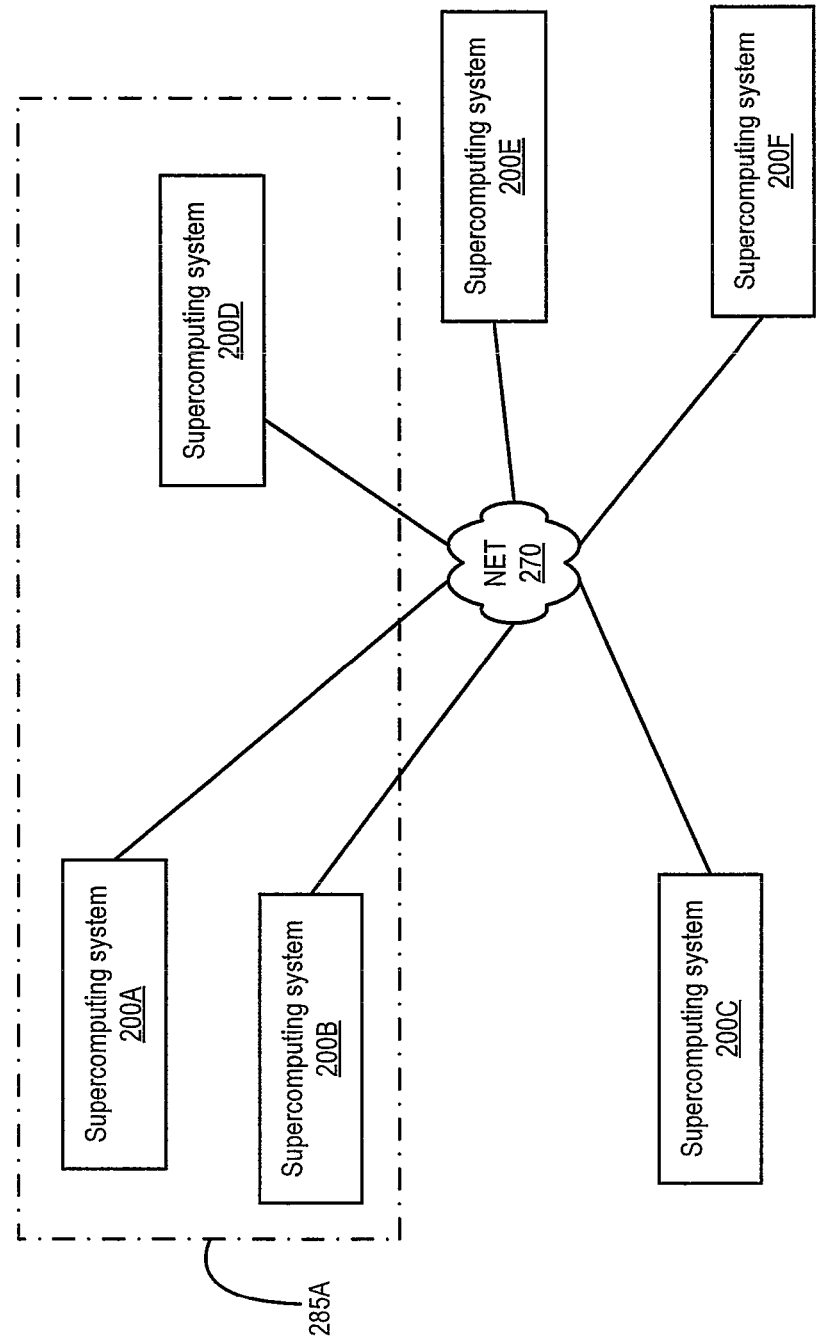

In one or more embodiments, resources of two or more super computing systems can be allocated to executing a job. As shown in FIG. 2F, job 285A can be executed on supercomputing systems 200A, 200B, and 200D. For example, job 285A may be allocated resources on supercomputing system 200D rather than supercomputing system 200C because communications may be faster to and/or from supercomputing system 200D than supercomputing system 200C.

Figure 3:
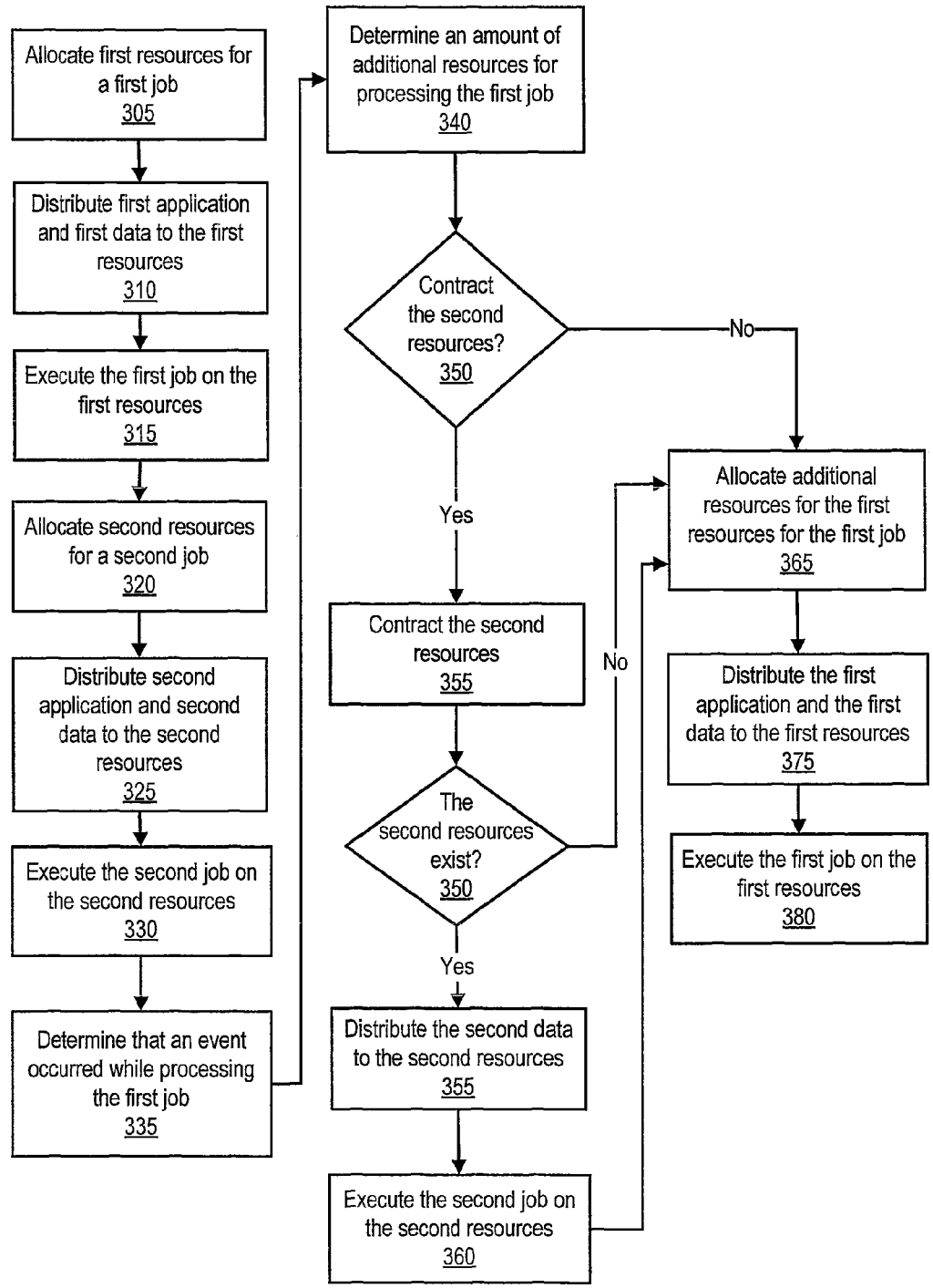
FIG. 3 illustrates a method for allocating resources for multiple jobs executed on a supercomputing system, according to one or more embodiments.

Turning now to FIG. 3, a method for allocating resources for multiple jobs executed on one or more supercomputing systems is illustrated, according to one or more embodiments. In one or more embodiments, the method illustrated in FIG. 3 can be a computer-implemented method of a global resource manager that can execute on a compute node. For example, the global resource manager can be included in application 185C that can be executed on one of compute nodes 210A1-210AN.

The method begins at block 305 where the global resource manager allocates first resources for a first job. For example, the global resource manager can allocate compute nodes 210A1-210A3 for job 285A. At 310, the global resource manager can distribute a first application and first data to the first resources. For example, the global resource manager can distribute application 185A and data from data 290A to compute nodes 210A1-210A3. In one or more embodiments, the global resource manager can distribute respective portions of data 290A to each of compute nodes 210A1-210A3. At 315, compute nodes 210A1-210A3 can execute job 285A.

At block 320, the global resource manager can allocate second resources to a second job. For example, the global resource manager can allocate compute nodes 210A5 and 210A6 to job 285B. At block 325, the global resource manager can distribute a second application and second data to the second resources. For example, the global resource manager can distribute application 185B and data from data 290B to compute nodes 210A5 and 210A6. In one or more embodiments, the global resource manager can distribute respective portions of data 290B to each of compute nodes 210A5 and 210A6. At 330, compute nodes 210A5 and 210A6 can execute job 285B.

At block 335, the global resource manager can determine that an event occurred while processing the first job. In one or more embodiments, the event can be triggered by some configuration, specification, and/or metric used to detect a state or an approximation of a state. For example, job 285A may be processing atmospheric data, and one or more of compute nodes 210A1-210A3 detect one or more cloud patterns that indicate conditions or approximate conditions for tornadic activity. For instance, this detection can trigger the event, and one or more of compute nodes 210A1-210A3 can transmit information (e.g., one or more messages) to the global resource manager that the event occurred.

In one or more embodiments, further analysis of the data and/or related (e.g., surrounding) data can be analyzed to provide better resolution. For example, compute nodes 210A1-210A3 may have been analyzing the atmospheric data in a first analysis mode, and to provide a better analysis of the atmospheric conditions or approximate atmospheric conditions that triggered the event, the global resource manager can provide instructions to compute nodes 210A1-210A3 to analyze the data in a second analysis mode. In one or more embodiments, the second analysis mode can provide better resolution or fidelity than the first analysis mode.

In one or more embodiments, performing a higher resolution analysis of the data can increase an amount of time in processing all of the first data. For example, the analysis of all the first data may be bounded or need to occur within a first amount of time. The global resource manager may calculate or compute an amount of additional resources needed to complete the analysis of the first data within the amount of time while taking into account the additional resolution of a portion of the data that triggered the event. In one or more embodiments, the global resource manager can calculate or compute an amount of additional resources needed to complete the analysis of the first data within less than the amount of time while taking into account the additional resolution of a portion of the data that triggered the event. For example, performing the higher resolution analysis of the data that indicated the possible tornadic activity can correspond to a greater allocation of resources such that the performing the higher resolution analysis is performed more expediently than the amount of time scheduled for the processing of the entire data set. At block 340, the global resource manager can determine an amount of additional resources for processing the first job using a higher resolution on at least a portion of the first data.

At block 345, the global resource manager can determine whether or not the second resources of the second job are to be contracted. In one or more embodiments, jobs executing on a supercomputing system can be ordered in terms of privilege and/or precedence. In one example, the second job may be a job of a graduate student and the first job may be a job of a professor, and jobs of professors may take precedence over jobs of graduate students. In a second example, the second job may be a job of a lesser contributor to the supercomputing system, and the lesser contributor's jobs are given a lower precedence.

If the second resources of the second job not are to be contracted, the global resource manager can allocate additional resources for the first resources of the first job such that the first job can be expanded at block 365. For example, the global resource manager can allocate compute node 210A4 for the first resources, and the first resources include compute nodes 210A1-210A4 that can be used to process job 285A. In one or more embodiments, the global resource manager can allocate resources from other supercomputing systems. For example, job 285A may already have all of resources of supercomputing system 200A allocated to processing data 290A. For instance, the global resource manager can allocate resources from other supercomputing systems such as supercomputing systems 200B and/or 200D which are coupled to supercomputing system 200A via NET 270. In one or more embodiments, the global resource manager can choose one supercomputing system coupled to NET 270 over another supercomputing system coupled to NET 270 based on one or more factors and/or attributes. For example, access to one supercomputing system coupled to NET 270 may be faster than another supercomputing system coupled to NET 270, and the global resource manager can choose the supercomputing system coupled to NET 270 with the faster access. In one or more embodiments, resources of other supercomputing systems 200B-200F can be managed using the elements, features, and/or functionality described in the method illustrated in FIG. 3. In one or more embodiments, application 185A of job 285A can be optimized to function over a network such as NET 270 in addition to being optimized for a HPC network.

At block 375, the global resource manager can distribute the first application and the first data to the first resources which have been expanded. For example, the global resource manager can distribute application 185A to compute node 210A4, as well. In one instance, the global resource manager can distribute different portions of data 290A to the first resources to allow for the analysis of data 290A and the higher resolution analysis of one or more portions of data 290A that triggered the event such that the analysis is scheduled to occur within the first amount of time. At block 380, the first resources which have been expanded can execute job 285A.

With reference to block 350, if the second resources of the second job are to be contracted, the global resource manager can contract the second resource at block 355. For example, the global resource manager can remove compute node 210A5 from the second resources. For instance, the global resource manager can allocate compute node 210A5 to the first resource after compute node 210A5 is removed from the second resource. At block 350, the global resource manager can determine whether or not the second resources exist. For example, the global resource manager may have contracted the second resource such that there are no resources available for the second resources. For instance, job 285B can be held in as inactive or held in abeyance until resources for the second resources are available. If the second resources do not exist, the global resource manager can proceed to block 365. If the second resources do exist, the global resource manager can proceed to block 355, where the global resource manager can distribute the second data to the second resources which have been contracted. For example, the global resource manager may distribute portions of data that were being processed on a resource that is no longer available to the second resources. For instance, the global resource manager can distribute one or more portions of data 290B that were being process by compute node 210A5 to compute node 210A6. At block 360, job 285B can be executed on the second resources which have been contracted, and the global resource manager can proceed to block 365.

In one or more embodiments, other events can be triggered. For example, other cloud formations can be detected that can cause another event to be triggered. For instance, the first resources can detect one or more cloud patterns that indicate conditions or approximate conditions for tornadic activity in another portion of data 290A. This detection can trigger another event, and the first resources can transmit information (e.g., one or more messages) to the global resource manager that the event occurred. As other events are detected, the global resource manager can proceed to block 335 of FIG. 3 and perform various portions of the illustrated method for each additional event.

Figure 4:
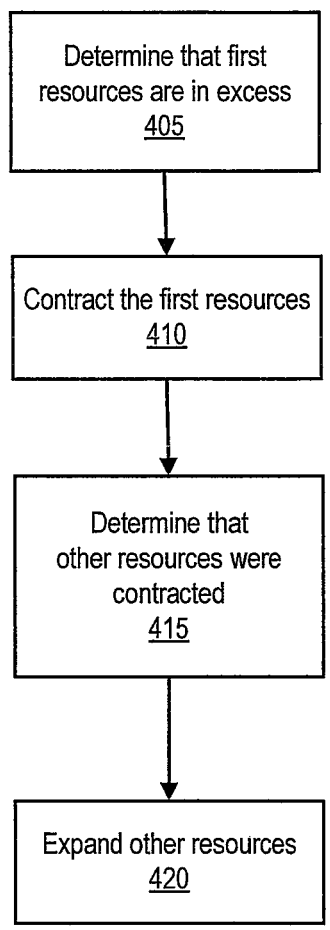
FIG. 4 illustrates a method for de-allocating resources for multiple jobs executed on a supercomputing system, according to one or more embodiments.

Turning now to FIG. 4, a method for de-allocating resources for multiple jobs executed on a supercomputing system is illustrated, according to one or more embodiments. In one or more embodiments, the method illustrated in FIG. 4 can be a computer-implemented method of a global resource manager that can execute on a compute node. For example, the global resource manager can be included in application 185C that can be executed on one of compute nodes 210A1-210AN.

The method begins at block 405 where the global resource manager can determine that first resources are in excess. For example, the first resources may have been expanded to increase resolution on a portion of a data set, and the global resource manager or one or more compute nodes can determine that the portion of the data set is anomalous data. For instance, the portion of the data set may have indicated possible tornadic activity, as discussed above. However, the global resource manager or one or more compute nodes can determine that the portion of the data set does not indicate tornadic activity upon analysis under a greater resolution. At

410, the global resource manager can contract the first resources. For example, the global resource manager can contract job 285A to use the resources of compute nodes 210A1-210A3 when job 285A was previously using compute nodes 210A1-210A5.

At block 415, the global resource manager can determine that other resources were contracted. For example, second resources may have been contracted so that the first resources could be expanded. At block 420, the global resource manager can expand the other resources. In one example, job 285B may have been contracted to use compute node 210A6, and the global resource manager can expand job 285B to include resources of compute nodes 210A5 and 210A6. In a second example, job 285B may have been held in as inactive or in abeyance until resources for the second resources become available, and the global resource manager can expand job 285B to include resources of compute node 210A6.

In one or more embodiments, expanding and contracting of supercomputing jobs can occur on logical boundaries of jobs being performed. For example, application 185A of job 285A can include logical boundaries where a number of computations are performed followed by an exchange of data between or among the resources allocated to job 285A. At these logical boundaries, job 285A can be expanded or contracted.

In the flow charts above, one or more of the methods and/or processes are embodied in a computer readable medium including computer readable code such that a series of steps are performed when the computer readable code is executed (by a processing unit). In one or more embodiments, some processes of the methods and/or processes can be combined, performed simultaneously, concurrently (e.g., scheduled quickly enough in time to appear simultaneous to a person), or in a different order, or perhaps omitted, without deviating from the spirit and scope of the invention. Thus, while the method(s) and/or process(es) are described and illustrated in a particular sequence, use of a specific sequence of processes is not meant to imply any limitations on the invention. Changes may be made with regards to the sequence of processes without departing from the spirit or scope of the present invention. Use of a particular sequence is therefore, not to be taken in a limiting sense, and the scope of the present invention extends to the appended claims and equivalents thereof.

As will be appreciated by one skilled in the art, the present invention may be embodied as a method, process, system, and/or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module," "logic", and/or "system." Furthermore, the present invention may take the form of an article of manufacture having a computer program product with a computer-usable storage medium having computer-executable program instructions/code embodied in or on the medium.

As will be further appreciated, the method(s) and/or process(es) in embodiments of the present invention may be implemented using any combination of software, firmware, microcode, and/or hardware. As a preparatory step to practicing the invention in software, the programming code (whether software or firmware) will typically be stored in one or more machine readable storage or memory mediums such as fixed (hard) drives, diskettes, magnetic disks, optical disks, magnetic tape, semiconductor memories such as RAMs, ROMs, PROMs, EPROMs, EEPROMs, etc., thereby making an article of manufacture, in one or more embodiments. The medium may be electronic, magnetic, optical, electromagnetic, infrared, or semiconductor system (or apparatus or device) or a propagation medium. Further, the medium may be any apparatus that may include, store, communicate, propagate, or transport the program for use by or in connection with the execution system, apparatus, or device. The method(s) and/or process(es) disclosed herein may be practiced by combining one or more machine-readable storage devices including the code/logic according to the described embodiment(s) with appropriate processing hardware to execute and/or implement the code/logic included therein. In general, the term computer, computer system, or data processing system can be broadly defined to encompass any device having a processor (or processing unit) which executes instructions/code from a memory medium.

While the invention has been described with reference to exemplary embodiments, it will be understood by those skilled in the art that various changes may be made and equivalents may be substituted for elements thereof without departing from the scope of the invention. In addition, modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, use of the terms first, second, etc. can denote an order if specified, or the terms first, second, etc. can be used to distinguish one element from another without an ordered imposed.

What is claimed is:

1. A computer-implemented method for operating a supercomputing system, comprising:
   processing a first supercomputing job with a first amount of resources of the supercomputing system;
   determining that an event occurred while processing a data set of the first supercomputing job, wherein the determining includes automatically determining the event occurred based on analysis of the data set by the processing;
   in response to determining that the event occurred:
      notifying a resource manager that the event occurred;
      determining a first amount of additional resources of the supercomputing system based on a first resolution of data employed in the processing of the data set, a second resolution of data to be employed in the processing of the data set, a size of the data set, and a target completion time for the first supercomputing job;
      allocating the first amount of additional resources of the supercomputing system;
      distributing at least a portion of the data set to the first additional computing resources;
      processing the first supercomputing job at the second resolution of the data set with the first amount of resources of the supercomputing system and the first amount of additional resources of the supercomputing system;
   during said processing of the first supercomputing job at the second resolution of the data set with the first amount of resources of the supercomputing system and the first amount of additional resources of the supercomputing system, determining whether the first supercomputing job is processing anomalous data not indicative of the event; and in response to determining that the first supercomputing job is processing anomalous data not indicative of the event, de-allocating the first amount of additional resources of the supercomputing system and resuming processing of the first supercomputing job at the first resolution with the first amount of resources of the supercomputing system.

2. The computer-implemented method of claim 1, further comprising:
processing a second supercomputing job with a second amount of resources of the supercomputing system; and
de-allocating a portion of the second amount of resources of the supercomputing system of the second supercomputing job.

3. The computer-implemented method of claim 2, further comprising:
processing the second supercomputing job with the second amount of resources of the supercomputing system less the de-allocated portion;
wherein said allocating the first amount of additional resources of the supercomputing system includes allocating the de-allocated portion of the second amount of resources of the supercomputing system.

4. The computer-implemented method of claim 3, further comprising:
de-allocating the first amount of additional resources of the supercomputing system;
processing the first supercomputing job with the first amount of resources of the supercomputing system;
allocating the de-allocated portion of the second amount of resources of the supercomputing system for the second supercomputing job; and
processing the second supercomputing job with the second amount of resources of the supercomputing system.

5. The computer-implemented method of claim 1, wherein the supercomputing system is coupled to a second supercomputing system through a network;
the method further comprising:
allocating a first amount of additional resources of the second supercomputing system; and
processing the first supercomputing job with the first amount of resources of the supercomputing system, the first amount of additional resources of the supercomputing system, and the first amount of additional resources of the second supercomputing system.

6. The method of claim 1, wherein the first resolution corresponds to a lesser analysis of the data set and the second resolution corresponds to a greater analysis of the data set.

7. A supercomputing system, comprising:
a plurality of computer nodes, wherein each of the plurality of computer nodes is coupled to another of the plurality of computer nodes;
data storage coupled to at least a first computer node of the plurality of computer nodes, wherein the data storage includes instructions that when executed on the first computer node provides logic for performing the functions of:
processing a first supercomputing job with a first amount of resources of the supercomputing system;
determining that an event occurred while processing a data set of the first supercomputing job, wherein the determining includes automatically determining the event occurred based on analysis of the data set by the processing;
in response to determining that the event occurred:
providing a notification that the event occurred;
determining a first amount of additional resources of the supercomputing system based on a first resolution of data employed in the processing of the data set, a second resolution of data to be employed in the processing of the data set, a size of the data set, and a target completion time for the first supercomputing job;
allocating the first amount of additional resources of the supercomputing system;
distributing at least a portion of the data set to the first additional computing resources; and
processing the first supercomputing job at the second resolution of the data set with the first amount of resources of the supercomputing system and the first amount of additional resources of the supercomputing system;
during said processing of the first supercomputing job at the second resolution of the data set with the first amount of resources of the supercomputing system and the first amount of additional resources of the supercomputing system not indicative of the event, determining whether the first supercomputing job is processing anomalous data; and
in response to determining that the first supercomputing job is processing anomalous data not indicative of the event, de-allocating the first amount of additional resources of the supercomputing system and resuming processing of the first supercomputing job at the first resolution with the first amount of resources of the supercomputing system.

8. The supercomputing system of claim 7, wherein the data storage further includes instructions that when executed on the first computer node provides logic for performing the functions of:
processing a second supercomputing job with a second amount of resources of the supercomputing system; and
p1 de-allocating a portion of the second amount of resources of the supercomputing system of the second supercomputing job.

9. The supercomputing system of claim 8, wherein the data storage further includes instructions that when executed on the first computer node provides logic for performing the function of:
processing the second supercomputing job with the second amount of resources of the supercomputing system less the de-allocated portion;
wherein said allocating the first amount of additional resources of the supercomputing system includes allocating the de-allocated portion of the second amount of resources of the supercomputing system.

10. The supercomputing system of claim 9, wherein the data storage further includes instructions that when executed on the first computer node provides logic for performing the functions of:
de-allocating the first amount of additional resources of the supercomputing system;
processing the first supercomputing job with the first amount of resources of the supercomputing system;
allocating the de-allocated portion of the second amount of resources of the supercomputing system for the second supercomputing job; and
processing the second supercomputing job with the second amount of resources of the supercomputing system.

11. The supercomputing system of claim 7, wherein the supercomputing system is coupled to a second supercomputing system through a network;

wherein the data storage further includes instructions that when executed on the first computer node provides logic for performing the functions of:
- allocating a first amount of additional resources of the second supercomputing system; and
- processing the first supercomputing job with the first amount of resources of the supercomputing system, the first amount of additional resources of the supercomputing system, and the first amount of additional resources of the second supercomputing system.

12. The supercomputing system of claim 7, wherein the first resolution corresponds to a lesser analysis of the data set and the second resolution corresponds to a greater analysis of the data set.

13. A computer readable memory medium comprising instructions, which when executed on a processing system of a supercomputing system, cause the supercomputing system to perform:
- processing a first supercomputing job with a first amount of resources of the supercomputing system;
- determining that an event occurred while processing a data set of the first supercomputing job, wherein the determining includes automatically determining the event occurred based on analysis of the data set by the processing;
- in response to determining that the event occurred:
  - notifying a resource manager that the event occurred;
  - determining a first amount of additional resources of the supercomputing system based on a first resolution of data employed in the processing of the data set, a second resolution of data to be employed in the processing of the data set, a size of the data set, and a target completion time for the first supercomputing job;
  - allocating the first amount of additional resources of the supercomputing system;
  - distributing at least a portion of the data set to the first additional computing resources;
  - processing the first supercomputing job at the second resolution of the data set with the first amount of resources of the supercomputing system and the first amount of additional resources of the supercomputing system;
- during said processing of the first supercomputing job at the second resolution of the data set with the first amount of resources of the supercomputing system and the first amount of additional resources of the supercomputing system not indicative of the event, determining whether the first supercomputing job is processing anomalous data; and
- in response to determining that the first supercomputing job is processing anomalous data not indicative of the event, de-allocating the first amount of additional resources of the supercomputing system and resuming processing of the first supercomputing job at the first resolution with the first amount of resources of the supercomputing system.

14. The computer readable memory medium of claim 13, wherein the instructions, when executed on the processing system of the supercomputing system, cause the supercomputing system to perform:
- processing the second supercomputing job with the second amount of resources of the supercomputing system less the de-allocated portion;
- wherein said allocating the first amount of additional resources of the supercomputing system includes allocating the de-allocated portion of the second amount of resources of the supercomputing system.

15. The computer readable memory medium of claim 14, wherein the instructions, when executed on the processing system of the supercomputing system, cause the supercomputing system to perform:
- de-allocating the first amount of additional resources of the supercomputing system;
- processing the first supercomputing job with the first amount of resources of the supercomputing system;
- allocating the de-allocated portion of the second amount of resources of the supercomputing system for the second supercomputing job; and
- processing the second supercomputing job with the second amount of resources of the supercomputing system.

16. The computer readable memory medium of claim 13, wherein the instructions, when executed on the processing system of the supercomputing system, cause the supercomputing system to perform:
- processing a second supercomputing job with a second amount of resources of the supercomputing system; and
- de-allocating a portion of the second amount of resources of the supercomputing system of the second supercomputing job.

17. The computer readable memory medium of claim 13, wherein the instructions, when executed on the processing system of the supercomputing system, cause the supercomputing system to perform:
- allocating a first amount of additional resources of a second supercomputing system coupled to the supercomputing system via a network; and
- processing the first supercomputing job with the first amount of resources of the supercomputing system, the first amount of additional resources of the supercomputing system, and the first amount of additional resources of the second supercomputing system.

18. The computer readable memory medium of claim 13, wherein the first resolution corresponds to a lesser analysis of the data set and the second resolution corresponds to a greater analysis of the data set.

* * * * *